Patented Jan. 25, 1949

2,460,002

UNITED STATES PATENT OFFICE 2,460,002

CATALYTIC AMIDIZATION PROCESS

Paul W. Garbo, Freeport, N. Y.

No Drawing. Application November 14, 1946, Serial No. 709,790

10 Claims. (Cl. 260—295.5)

This application is a division of the copending application, Serial No. 470,817, filed December 31, 1942, now Patent No. 2,419,831, issued April 29, 1947.

This invention relates to the amidization of pyridine monocarboxylic acids and, more particularly, to the manufacture of nicotinamide.

Nicotinamide, the amide of nicotinic acid or pyridine 3-carboxylic acid, is recognized as an important vitamin product which is prescribed in preference to nicotinic acid because of the latter's undesirable side reactions and physiological effects with certain individuals.

Of the methods of producing nicotinamide known to me, the one proposing the conversion of ammonium nicotinate to nicotinamide has received greatest attention by the workers in this field because, from a theoretical point of view, one might predict it to be the most direct and economical. Basically, this known method involves the formation of ammonium nicotinate, which may be obtained by merely neutralizing nicotinic acid with ammonium hydroxide, and splitting off with the aid of heat a molecule of water from each molecule of ammonium nicotinate to leave a molecule of nicotinamide. However, in the latter step, since ammonium nicotinate is not a very stable compound, heat tends to decompose the nicotinate into the original nicotinic acid and ammonia. Accordingly, this method has led to poor yields of nicotinamide and cumbersome separation and recycling techniques for unconverted material.

Considerable improvement in this process was effected when ammonia gas was bubbled up through the mass of molten ammonium nicotinate undergoing the heat treatment. Thus, by bubbling ammonia through molten ammonium nicotinate at an elevated temperature, e. g., about 160°–170° C. conversions as high as about 85% were effected. That is to say, the final reaction mass would show by analysis to comprise about 85% nicotinamide and about 15% nicotinic acid as such or as its salt. Even to reach 85% conversion, however, the time of heating and bubbling ammonia ran into many hours; higher conversions were possible but the time of reaction became unreasonably long for usual commercial practice.

Furthermore, from such a reaction mass, the recovery of nicotinamide in a form meeting present stringent specifications for melting point, color, pH, ash, etc., has required cumbersome, time-consuming and expensive procedures. Also, in view of the high cost of nicotinic acid, it has been necessary to recover, with some difficulty and expense, the unconverted acid for reuse in a subsequent reaction.

My invention therefore has as a principal object, the provision of a method for the amidization of pyridine monocarboxylic acids which is characterized by its simplicity, the speed of reaction and excellent yield.

A further object is to produce the amides of pyridine monocarboxylic acids without recourse to the use of ammonia gas with its attendant difficulties and disadvantages; in place of ammonia, urea is employed as the amidizing agent.

Another object of my invention is to facilitate the recovery of the amides in high purity from their reaction masses.

A still further object is to avoid the usual neutralization step for converting pyridine monocarboxylic acids to the ammonium salts, which step is wasteful in the consumption of energy and time which are required to remove the water of the neutralization reaction.

Other objects of my invention will become apparent from the disclosure which follows.

The invention is based on the discovery that pyridine monocarboxylic acids are converted to the corresponding amides simply by reacting the acids with molten urea in the presence of a catalyst of the amidization reaction.

According to the invention, the desired pyridine monocarboxylic acid is made to react with the molten urea in any convenient manner such as mixing the comminuted acid and urea and heating the mixture until it becomes fluid or introducing the acid gradually into a molten mass of urea. While the reaction starts at about the melting point of urea, viz., 130° C., higher temperatures are usually employed to promote the reaction. The reaction mass is maintained in the heated fluid state until periodic analyses of the reaction mass indicate that the reaction has come to a satisfactory stage of completion. Thereupon the produced amide may be separated from the reaction mass comprising, besides the amide, unreacted material, and derivatives and degradation products of urea, e. g., biuret and cyanuric acid, by any of the known methods.

It appears that in the course of the reaction an appreciable proportion of the urea used is converted to biuret and cyanuric acid. Consequently, while one-half mol of urea with its two $NH_2$ groups should theoretically suffice to convert one mol of pyridine monocarboxylic acid to the amide, as a practical matter it is advisable to use not less than about one mol of urea for each mol of acid. Preferably, about 2 mols of urea are used with each mol of acid. Inasmuch as the urea seems to act as a flux as well as a reagent for the reaction, large excesses of urea may be employed. However, from an economical point of view, a ratio of about 3 mols of urea to each mol of acid represents the normal upper limit of urea consumption. It should be noted that urea is inexpensive as compared with the pyridine monocarboxylic acids; furthermore, such by-products of the reaction as biuret and cyanuric are recoverable and salable. Thus it will be seen that the process of my invention enjoys a very favorable economy.

As has been stated, the amidization commences with the melting of the urea, i. e., at about 130° C., but progresses more rapidly as the temperature is raised. Temperatures in the range of about 150° to about 280° C. are generally employed. Preferably, the temperature is maintained in the range of about 170° to about 230° C. It is understood that the desirable reaction temperature will differ with each pyridine monocarboxylic acid that is utilized since its melting point and that of the corresponding amide will influence the fluidity of the reaction mass. Thus, for one example, when nicotinic acid is reacted with molten urea in accordance with my invention to produce nicotinamide which has a melting point of about 131° C., a reaction temperature of about 180° to about 220° C. is very satisfactory. In general, the temperature is so controlled that the reaction mass is kept in a fluid condition without reaching a stage where excessive foaming occurs.

The amidization, according to this invention, is carried out in the presence of a catalyst consisting of or containing the element boron. While common boron compounds such as borax and sodium perborate are suitable catalysts, the preferred catalyst is boric acid. In my copending application, Serial No. 470,817, now Patent 2,419,831, April 4, 1947, I have disclosed that other suitable amidization catalysts consist of or contain elements of Groups V and VI of the Mendeléeff Periodic System having an atomic number between 15 and 92, inclusive. Representative catalysts are diammonium phosphate, bismuth sulfate, ammonium vanadate, arsenious oxide and selenium molybdate. Two or more catalysts may be used or the catalyst may be a compound of two or more active elements, e. g., ammonium borotungstate or phosphomolybdate. Preferred catalysts are boric acid and ammonium molybdate. Of course, the catalysts vary in their activity but the catalytic amount used will generally be in the range of about 0.1 to about 5.0% of the weight of the entire reaction mass.

In some instances, in conducting the amidization it may be helpful to add a fluidizing medium (a high boiling-point liquid) such as naphthalene, kerosene, quinoline, nitrobenzene or chloronaphthalene.

As an illustrative example of the process of my invention, there may be cited the production of nicotinamide. To 120 parts by weight of urea are added 123 parts of nicotinic acid mixed with 0.3 part of boric acid. The entire mixture is heated and brought to a temperature of about 180° to 220° C. In less than 30 minutes the reaction may be considered completed. It is desirable to agitate the reaction mass while the reaction is in progress. The pure nicotinamide product may be recovered from the reaction mass by known methods, e. g., crystallization from suitable solvents.

Some ammonia may be evolved in the course of the reaction and, accordingly, in some instances it may be advisable to carry out the operation in a closed system under pressure.

Instead of the free pyridine monocarboxylic acids, the corresponding ammonium salts may be converted to amides by heating them in the presence of urea and a boron catalyst of the present invention. When the ammonium salts or mixtures of the ammonium salts and the free acids are utilized in the amidization process, appreciably less urea is required than when free acids alone are used.

In view of the foregoing description, it will be understood that the reaction temperature and time will vary considerably with the particular material, free acid or ammonium salt, that is to be converted, with the selected proportion of urea and with the chosen catalyst.

Obviously, many modifications of the basic process of my invention will suggest themselves to those skilled in the art. For example, the operation may be made continuous by suspending the comminuted pyridine monocarboxylic acid in molten urea containing catalyst and by pumping the fluid mixture through a heated tube maintained at reaction temperature; the heated tubular reactor is of sufficient length to discharge a mass in which the original acid has reached a satisfactory stage of conversion to the amide.

The term, pyridine monocarboxylic acids, as used in this specification and the appended claims, comprehends benzopyridine monocarboxylic acids, such as quinaldinic acid.

The above description and examples are intended to be illustrative only. Variations of my invention conforming to its spirit are to be considered within the scope of the claims.

What I claim is:

1. The process for the amidization of pyridine monocarboxylic acid compounds of the class consisting of pyridine monocarboxylic acids and their ammonium salts, which comprises reacting a said compound with urea in the proportions of about 2 mols of urea for each mol of said compound in the presence of a boron catalyst, and recovering thus produced amide from the resulting reaction mass.

2. The process for the amidization of pyridine monocarboxylic acid compounds of the class consisting of pyridine monocarboxylic acids and their ammonium salts, which comprises reacting a said compound with urea at a temperature in the range of about 150° to about 280° C. in the presence of a boron catalyst, and recovering thus produced amide from the resulting reaction mass.

3. The process for the amidization of pyridine monocarboxylic acid compounds of the class consisting of pyridine monocarboxylic acids and their ammonium salts, which comprises reacting a said compound with urea in the proportions of about 2 mols of urea for each mol of said compound at a temperature in the range of about 150° to about 280° C. in the presence of both a boron catalyst and a catalyst containing an element selected from Groups V and VI of the Mendeléeff Periodic System and having an atomic number between 15 and 92 inclusive, and recovering thus produced amide from the resultive reaction mass.

4. The process for the amidization of pyridine monocarboxylic acid compounds of the class consisting of pyridine monocarboxylic acids and their ammonium salts, which comprises reacting a said compound with urea at a temperature in the range of about 150° to about 280° C. in the presence of both boric acid and ammonium molybdate as catalysts, and recovering thus produced amide from the resulting reaction mass.

5. The process for the production of nicotinamide, which comprises reacting a nicotinic acid compound of the class consisting of nicotinic acid and its ammonium salt with urea in the proportions of about 2 mols of urea for each mol of said compound in the presence of a boron catalyst and recovering thus produced nicotinamide from the resulting reaction mass.

6. The process for the production of nicotinamide, which comprises reacting a nicotinic acid compound of the class consisting of nicotinic acid and its ammonium salt with urea in the presence of a boron catalyst, maintaining the reaction at a temperature in the range of about 150° to about 280° C., and recovering thus produced nicotinamide from the resulting reaction mass.

7. The process for the production of nicotinamide, which comprises reacting a nicotinic acid compound of the class consisting of nicotinic acid and its ammonium salt with urea in the proportions of about 2 mols of urea for each mol of said compound in the presence of both a boron catalyst and a molybdenum catalyst, maintaining the reaction at a temperature in the range of about 150° to about 280° C., and recovering thus produced nicotinamide from the resulting reaction mass.

8. The process for the production of nicotinamide, which comprises reacting a nicotinic acid compound of the class consisting of nicotinic acid and its ammonium salt with urea in the presence of boric acid as catalyst, maintaining the reaction at a temperature in the range of about 170° to about 230° C., and recovering thus produced nicotinamide from the resulting reaction mass.

9. The process for the production of nicotinamide, which comprises reacting a nicotinic acid compound of the class consisting of nicotinic acid and its ammonium salt with urea in the presence of both boric acid and ammonium molybdate as catalysts, maintaining the reaction at a temperature in the range of about 170° to about 230° C., and recovering thus produced nicotinamide from the resulting reaction mass.

10. The process for the production of nicotinamide, which comprises reacting nicotinic acid with urea in the proportions of about 2 mols of urea for each mol of nicotinic acid in the presence of boric acid as catalyst, maintaining the reaction at a temperature in the range of about 170° to about 230° C., and recovering thus produced nicotinamide from the resulting reaction mass.

PAUL W. GARBO.

REFERENCES CITED

The following references are of record in the file of this patent:

UNITED STATES PATENTS

| Number | Name | Date |
| --- | --- | --- |
| 2,314,843 | Haltquist | Mar. 23, 1943 |
| 2,419,831 | Garbo | Apr. 29, 1947 |